(12) United States Patent
Hiraoka et al.

(10) Patent No.: US 10,977,455 B2
(45) Date of Patent: Apr. 13, 2021

(54) TAG READER, RFID SYSTEM, AND METHOD FOR READING IDENTIFICATION INFORMATION

(71) Applicant: Konica Minolta, Inc., Tokyo (JP)

(72) Inventors: Saburou Hiraoka, Tokyo (JP); Shoichi Uratani, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/651,028

(22) PCT Filed: Aug. 20, 2018

(86) PCT No.: PCT/JP2018/030596
§ 371 (c)(1),
(2) Date: Mar. 26, 2020

(87) PCT Pub. No.: WO2019/064989
PCT Pub. Date: Apr. 4, 2019

(65) Prior Publication Data
US 2020/0250387 A1    Aug. 6, 2020

(30) Foreign Application Priority Data

Sep. 29, 2017  (JP) .............................. JP2017-190567

(51) Int. Cl.
*G06K 7/10* (2006.01)
*G06K 19/07* (2006.01)
(52) U.S. Cl.
CPC ..... *G06K 7/10128* (2013.01); *G06K 7/10366* (2013.01); *G06K 19/0723* (2013.01)

(58) Field of Classification Search
CPC ........... G06K 7/10128; G06K 7/10366; G06K 19/0723
USPC ......................................................... 235/451
See application file for complete search history.

(56) References Cited

U.S. PATENT DOCUMENTS

2015/0302231 A1*  10/2015  Makimoto .......... H01P 1/20363
340/10.1

FOREIGN PATENT DOCUMENTS

| JP | 2005-242396 | 9/2005 |
| JP | 2008-090796 | 4/2008 |
| JP | 2008-099266 | 4/2008 |
| JP | 2008-137787 | 6/2008 |
| JP | 2009-529724 | 8/2009 |

(Continued)

OTHER PUBLICATIONS

Machine translation into English of Kondo et al. (JP 2017/084339).*

(Continued)

*Primary Examiner* — Daniel A Hess
(74) *Attorney, Agent, or Firm* — BakerHostetler

(57) ABSTRACT

This tag reader can be applied to a chipless RFID tag having a plurality of resonance frequencies that are associated with identification information. The tag reader is provided with: a radiation unit that radiates electromagnetic waves within a predetermined millimeter wave or microwave frequency band so as to cause sweeping of the radiation frequency; and a detection unit that detects the plurality of resonance frequencies of a chipless RFID tag on the basis of the reflection characteristics of waves reflected from the chipless RFID tag when the electromagnetic waves are radiated.

15 Claims, 11 Drawing Sheets

(56) References Cited

FOREIGN PATENT DOCUMENTS

| JP | 2015-195561 | 11/2015 |
|---|---|---|
| JP | 2017-084339 | 5/2017 |

OTHER PUBLICATIONS

Machine translation into English of Haruhide et al. (JP 2008/099266).*
Machine translation into English of Nagai et al. (JP2008137787).*
Machine translation into English of Ishikawa (JP 2008/090796).*
Machine translation into English of Horinuchi (JP 2005-242396).*
International Patent Application No. PCT/JP2018/030596; Int'l Written Opinion and Search Report; dated Oct. 23, 2018; 11 pages.

* cited by examiner

TAG READER, RFID SYSTEM, AND METHOD FOR READING IDENTIFICATION INFORMATION

The present U.S. Patent Application is U.S. National Phase Application under 35 U.S.C. 371 of International Application PCT/JP2018/030596 filed on Aug. 20, 2018, which claims a priority under the Paris Convention to Japanese Patent Application No. 2017-190567 filed on Sep. 29, 2017, the entire disclosures of which are incorporated herein by reference in their entireties.

TECHNICAL FIELD

The present disclosure relates to a tag reader, an RFID system, and a method for reading identification information.

BACKGROUND ART

In the related art, as an example of tags for associating information or the like about an item, barcodes are known. Barcodes are low in price, and therefore, are currently printed on various items and widely used as a means for digitizing information about the items. In a case of barcode tags, in order to correctly read content printed on a barcode tag, a barcode reader needs to be brought close to the barcode at a distance of about several centimeters from the barcode. This reading operation may be troublesome to the operator. In a case where a portion in which a barcode is printed is dirty, the printed content is illegible, which is a problem. In addition, a barcode is printed on the surface of an item at a position so as to be viewable, and therefore, may be easily rewritten by a malicious person, which is also a problem.

In the related art, electronic tags or the like in which an IC chip is built are known. In such electronic tags, an IC chip needs to be provided, which causes a cost problem. Further, a radiated wave radiated from the IC chip to an RFID reader is likely to be canceled by a metal component or the like disposed nearby, which makes it difficult to attain high readability.

Currently, as a technique that replaces barcodes and electronic tags in which an IC chip is built, tags called "chipless RFID tags" attract attention.

Chipless RFID tags have a pattern formed on a base. This pattern changes reflection properties resulting from an emitted electromagnetic wave (for example, the resonance frequency and the intensity pattern of the reflected wave) to thereby configure identification information. A tag reader detects the reflection properties resulting from the electromagnetic wave emitted to the chipless RFID tag to thereby read the identification information attached to the chipless RFID tag (see, for example, PTL 1).

CITATION LIST

Patent Literatures

PTL 1: Japanese Unexamined Patent Application Publication (Translation of PCT Application) No. 2009-529724

SUMMARY OF INVENTION

Technical Problem

For an RFID system as described above, there are demands for, for example, increasing the information density (which represents the amount of identification information per unit area) of chipless RFID tags and increasing check accuracy when identification information is read from the chipless RFID tags.

The present disclosure has been made in view of the above-described problems, and an object thereof is to provide a tag reader, an RFID system, and a method for reading identification information that are more suitable to chipless RFID tags.

Solution to Problem

The present disclosure mainly solving the problems mentioned above is a tag reader applicable to a chipless RFID tag having a plurality of resonance frequencies associated with identification information, the tag reader comprising:

a radiating section that radiates an electromagnetic wave in such a manner as to cause a radiation frequency to sweep in a predetermined EHF band or gigahertz band; and a detecting section that detects the plurality of resonance frequencies of the chipless RFID tag on the basis of a reflection property of a reflected wave from the chipless RFID tag resulting from the radiated electromagnetic wave.

In another aspect, the present disclosure mainly solving the problems mentioned above is an RFID system comprising the tag reader.

In another aspect, the present disclosure mainly solving the problems mentioned above is a method for reading identification information of a chipless RFID tag having a plurality of resonance frequencies associated with the identification information, the method comprising:

radiating an electromagnetic wave in such a manner as to cause a radiation frequency to sweep in a predetermined EHF band or gigahertz band; and detecting the plurality of resonance frequencies of the chipless RFID tag on the basis of a reflection property of a reflected wave from the chipless RFID tag resulting from the radiated electromagnetic wave.

Advantageous Effects of Invention

With the tag reader according to the present disclosure, it is possible to increase the information density of chipless RFID tags and to increase check accuracy when identification information is read from the chipless RFID tags.

DESCRIPTION OF EMBODIMENTS

Figure 1:
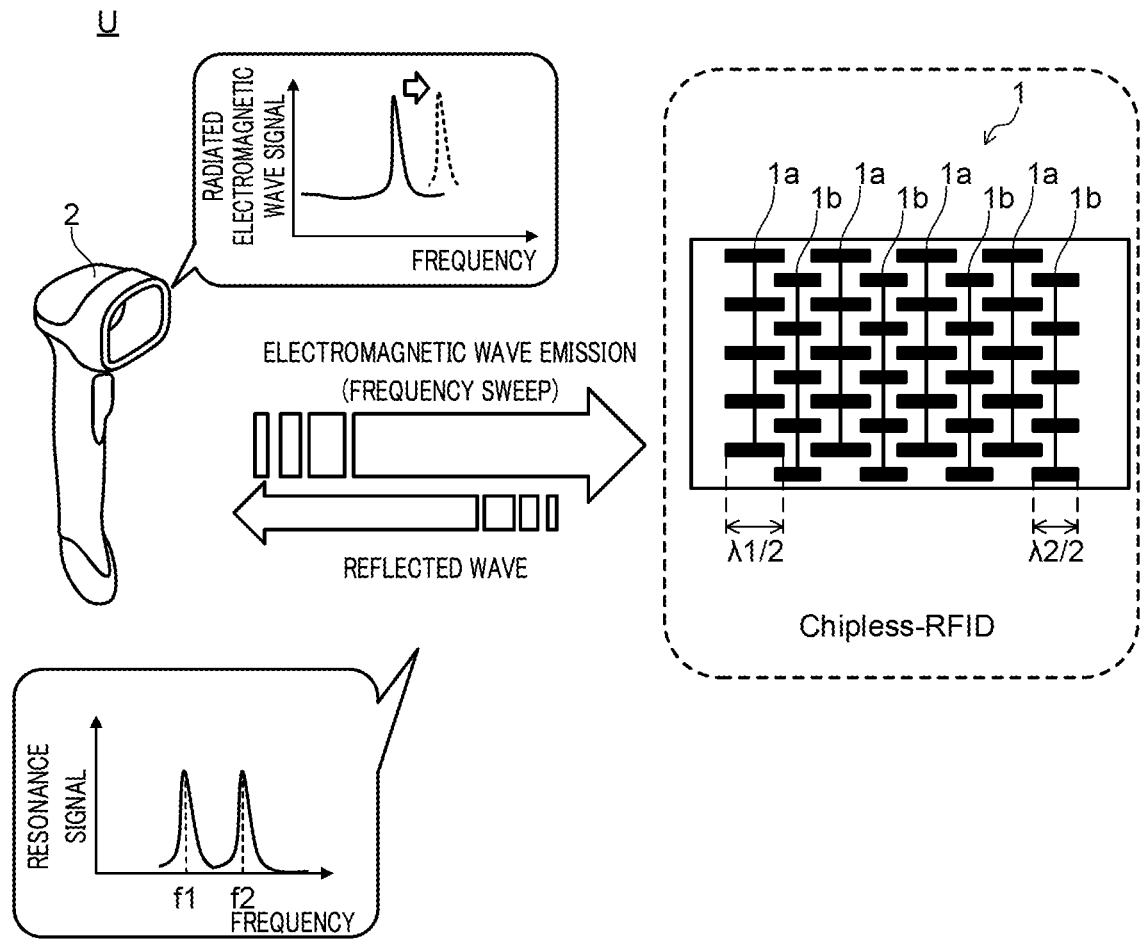
FIG. 1 is a diagram illustrating an example configuration of an RFID system according to a first embodiment.

Hereinafter, preferred embodiments of the present disclosure will be described in detail with reference to the attached drawings. Note that elements having substantially the same functions are assigned the same reference numerals in the description and drawings, and duplicated descriptions thereof are omitted.

[Configuration of RFID System]

First, an example of an RFID system according to one embodiment will be described with reference to FIG. 1.

FIG. 1 is a diagram illustrating an example configuration of RFID system U according to this embodiment.

RFID system U according to this embodiment includes chipless RFID tag 1 and tag reader 2.

Chipless RFID tag 1 (hereinafter simply referred to as "tag") has a plurality of resonance structures each of which resonates when an electromagnetic wave having a corresponding one of the predetermined frequencies is emitted thereto. In tag 1, identification information is configured with such plurality of resonance frequencies. In the following description, the resonance frequencies caused by the resonance structures of tag 1 are simply referred to as "resonance frequencies of tag 1".

In FIG. 1, as an example of the resonance structures of tag 1, microstrip antennas 1a and microstrip antennas 1b formed on a base are illustrated. Each microstrip antenna 1a resonates when an electromagnetic wave is emitted thereto and substantially half the wavelength of the electromagnetic wave is equal to the length of the pattern thereof (first wavelength λ1/2 in FIG. 1). Each microstrip antenna 1b resonates when an electromagnetic wave is emitted thereto and substantially half the wavelength of the electromagnetic wave is equal to the length of the pattern thereof (second wavelength λ2/2 in FIG. 1). That is, in tag 1 in FIG. 1, identification information is configured with first resonance frequency f1 that corresponds to first wavelength λ1 and second resonance frequency f2 that corresponds to second wavelength λ1.

The resonance structures of tag 1 are formed so that the resonance frequencies are within an EHF band or a gigahertz band (1 GHz to 3 THz).

The identification information may be configured in tag 1 as desired as long as the identification information is associated with the resonance frequencies of tag 1. The identification information is expressed by, for example, "0010100" (the rightmost digit corresponds to the first digit) in which the identification code in a digit place (for example, the third digit) corresponding to first resonance frequency f1 is set to "1" and the identification code in a digit place (for example, the fifth digit) corresponding to second resonance frequency f2 is set to "1".

Tag reader 2 radiates and emits to tag 1 an electromagnetic wave having a high frequency (for example, in the EHF band of 10 GHz to 3 THz). At this time, tag reader 2 radiates the electromagnetic wave in such a manner as to cause the radiation frequency to sweep in a predetermined frequency band and detects the plurality of resonance frequencies (first resonance frequency f1 and second resonance frequency f2 in FIG. 1) of tag 1 on the basis of the reflection properties of the reflected wave from tag 1 resulting from the radiated electromagnetic wave.

RFID system U according to this embodiment is characterized by the use of an electromagnetic wave in the EHF band or gigahertz band (which represents a range of 1 GHz to 3 THz, the same applies hereinafter).

An electromagnetic wave in the EHF band or gigahertz band has properties of being highly directional (that is, highly rectilinear) and having a high frequency resolution when detected.

Therefore, in RFID system U according to this embodiment, tag reader 2 can use such properties of the electromagnetic wave of being highly directional (that is, highly rectilinear) to narrow down a region to which the electromagnetic wave is emitted, which leads to highly accurate check.

Further, in RFID system U according to this embodiment, the high frequency resolution of the electromagnetic wave and a short wavelength thereof can be used to reduce the size of the resonance structures formed on tag 1 and to increase the number of types of resonance structures formed on tag 1 (that is, the number of resonance frequencies). In other words, information density can be further increased accordingly.

[Configuration of Tag Reader]

Next, a configuration of tag reader 2 will be described with reference to FIG. 2 and FIG. 3.

Figure 2:
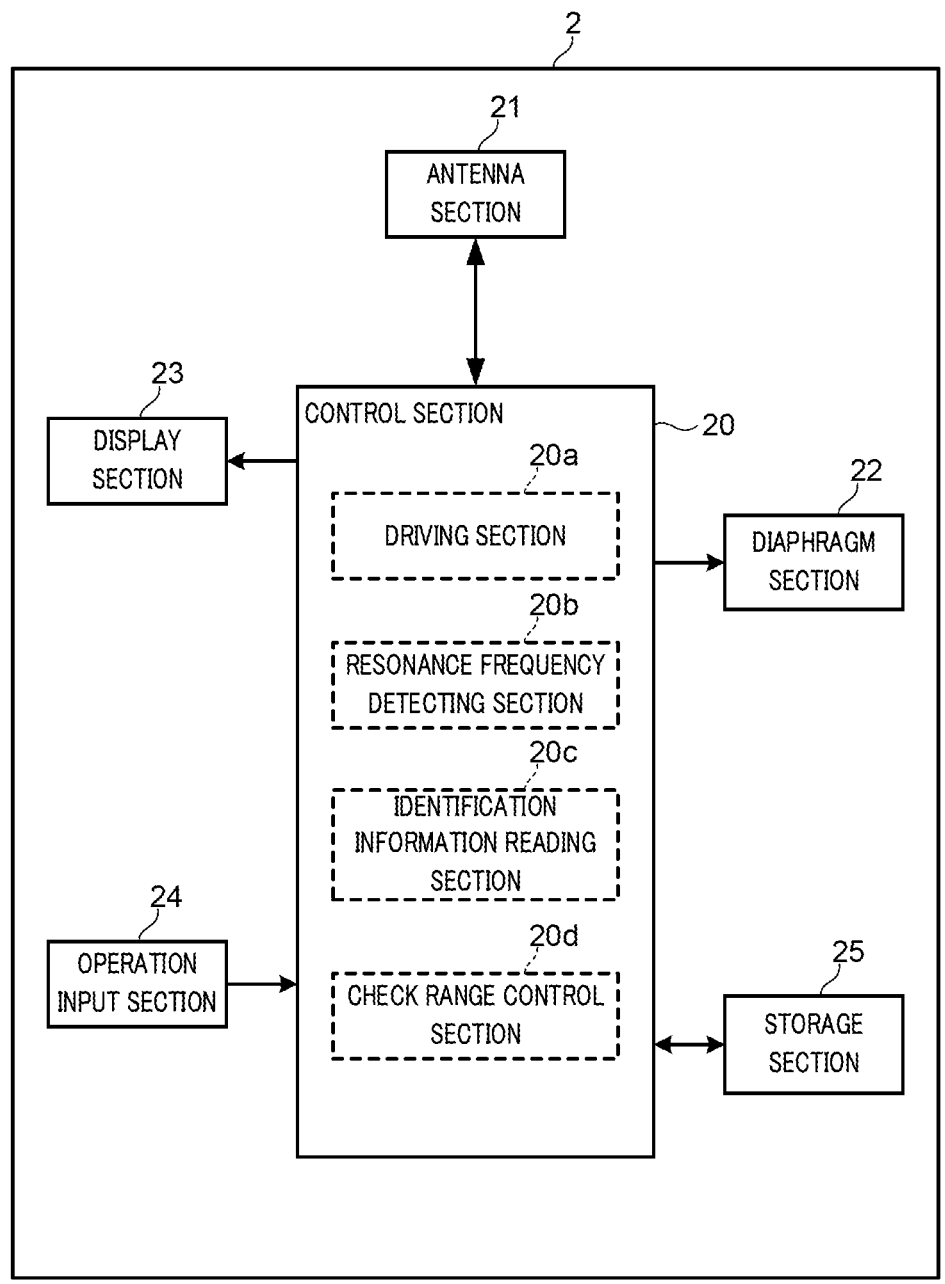
FIG. 2 is a diagram illustrating an example configuration of a tag reader according to the first embodiment.

FIG. 2 is a diagram illustrating an example configuration of tag reader 2 according to this embodiment.

Tag reader 2 includes antenna section 21, diaphragm section 22, display section 23, operation input section 24, storage section 25, and control section 20.

Antenna section 21 radiates an electromagnetic wave having a predetermined frequency on the basis of a driving signal from control section 20 (driving section 20a). Antenna section 21 receives a reflected wave from tag reader 2 resulting from the radiated electromagnetic wave and outputs the reflected wave to control section 20 (resonance frequency detecting section 20b).

The radiation frequency of the electromagnetic wave radiated from antenna section 21 is, for example, a sinusoidal wave having a peak intensity at a single frequency. The radiation frequency of the electromagnetic wave is changed so as to frequency-sweep the EHF band or gigahertz band on the basis of a driving signal from control section 20 (driving section 20a).

As antenna section 21, for example, a dipole antenna or a horn antenna is used. Here, a common antenna is used as a transmission antenna and a reception antenna; however, separate antennas may be used.

Note that "radiating section" of the present invention is formed of antenna section 21 and driving section 20a, and "detecting section" thereof is formed of antenna section 21 and resonance frequency detecting section 20b.

Diaphragm section 22 restricts an angle of radiation at which the electromagnetic wave is radiated outside the casing from antenna section 21 (which will be described below with reference to FIG. 3 to FIG. 5).

Display section 23 is formed of, for example, a liquid crystal display (LCD). Display section 23 displays various operation screens and the identification information configured in tag 1 in accordance with a display control signal input from control section 20.

Operation input section 24 includes various switches including a power switch for turning a main power supply on and off and an emission switch for radiating (emitting) the electromagnetic wave, and accepts various input operations from a user and outputs operation signals to control section 20.

Storage section 25 is formed of a nonvolatile semiconductor memory or hard disk drive and stores a control program and various types of data.

Control section 20 is a controller that centrally controls tag reader 2, and includes driving section 20a, resonance frequency detecting section 20b, identification information reading section 20c, and check range control section 20d.

Driving section 20a generates a driving signal (for example, a sinusoidal signal) corresponding to the electromagnetic wave to be radiated from antenna section 21 and supplies the driving signal to antenna section 21. Driving section 20a includes, for example, a variable-frequency generator, an amplifier, and a frequency setting section.

In a case of checking the identification information of tag 1, driving section 20a temporally changes the radiation frequency of the electromagnetic wave to be radiated from antenna section 21 to frequency-sweep a predetermined frequency band set in advance (for example, continuously changes the radiation frequency from 60 GHz to 90 GHz). Accordingly, the plurality of resonance frequencies of tag 1 are searched. In other words, when each resonance frequency among the plurality of resonance frequencies of tag 1 matches the radiation frequency of the electromagnetic wave radiated from antenna section 21, the resonance frequency is detected as a change in the reflection properties of the reflected wave from tag 1.

Driving section 20a causes antenna section 21 to radiate the electromagnetic wave, and the frequency band of the electromagnetic wave is the EHF band or gigahertz band as described above.

Resonance frequency detecting section 20b detects the plurality of resonance frequencies of tag 1 on the basis of the reflection properties of the reflected wave from tag 1 resulting from the radiated electromagnetic wave. Resonance frequency detecting section 20b includes, for example, a network analyzer and detects the reflection properties from S parameters obtained from the power and so on of the reflected wave reflected to antenna section 21.

Identification information reading section 20c identifies the identification information of tag 1 on the basis of the plurality of resonance frequencies of tag 1 detected by resonance frequency detecting section 20b.

Check range control section 20d controls power to be supplied to antenna section 21 from driving section 20a, the degree of aperture of diaphragm section 22, and so on so that the electromagnetic wave is emitted to a check target range (which represents a region to which the electromagnetic wave is emitted with an intensity equal to or higher than a predetermined threshold, the same applies hereinafter) set by, for example, an operator.

When check range control section 20d controls the power to be supplied to antenna section 21, the output of the electromagnetic wave to be radiated from antenna section 21 is controlled, and the check target range in the depth dimension in the direction in which the electromagnetic wave is radiated is adjusted. Such an output adjustment is suitable for, for example, prevention of halation of the electromagnetic wave in a case where tag 1 is located at a short distance and for avoidance of checking of another tag in the depth direction that the user does not want to check. The output from antenna section 21 is preferably in a range of, for example, 0<output 250 mW. With this range, tag 1 of an item that is to be checked and that is located at a distance of several centimeters to ten-odd meters can be checked with high accuracy.

The check target range (for example, the distance in the depth dimension in the direction in which the electromagnetic wave is radiated and the angle of radiation at which the electromagnetic wave is radiated) referred to by check range control section 20d is set by, for example, an operator using operation input section 24 or by a distance measuring section (which will be described below with reference to FIG. 8).

Control section 20 includes, for example, a CPU, a ROM, and a RAM. Some or all of driving section 20a, resonance frequency detecting section 20b, identification information reading section 20c, and check range control section 20d described above are implemented by the CPU referring to the control program (for example, a processing program) and various types of data. However, some or all of the functions may be implemented as processing by a DSP or processing by a hardware circuit instead of or in combination with the processing by the CPU.

[Casing Structure of Tag Reader]

Next, in the casing structure of tag reader 2, the structure of diaphragm section 22 will be mainly described with reference to FIG. 3 to FIG. 5.

In order to increase check accuracy, tag reader 2 according to this embodiment includes diaphragm section 22 described above and so on to make the check range (hatched region A in FIG. 3) adjustable.

Figure 3:
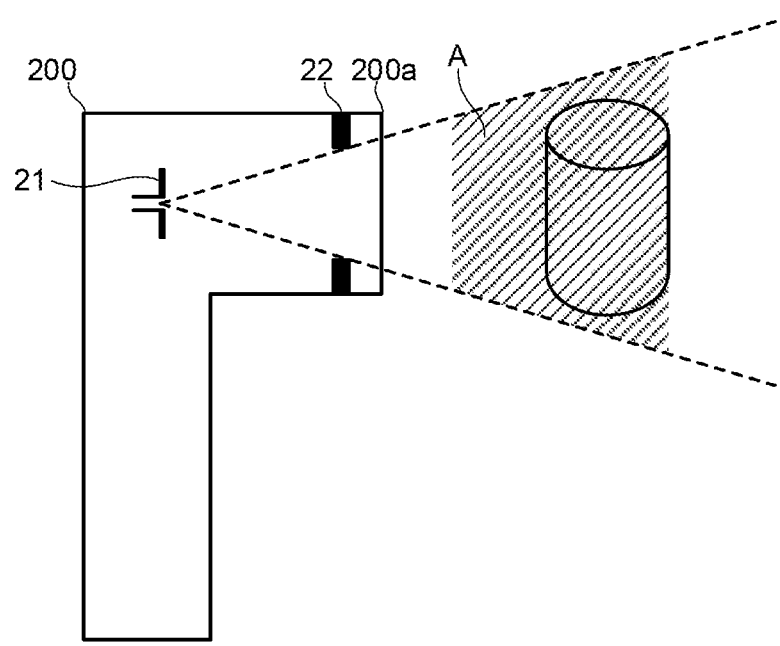
FIG. 3 is a diagram illustrating an example structure of a diaphragm section of the tag reader according to the first embodiment.
Figure 4A:
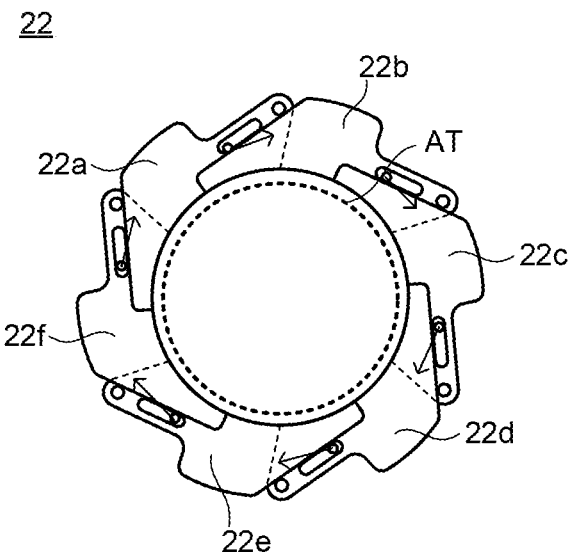
FIGS. 4A, 4B, and 4C are diagrams illustrating an example structure of the diaphragm section of the tag reader according to the first embodiment.
Figure 4B:
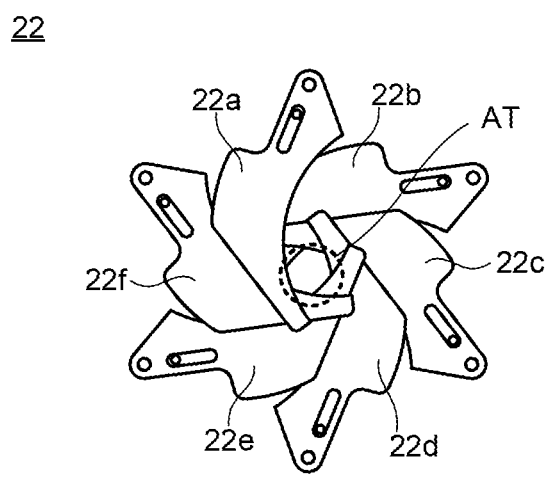
Figure 4C:
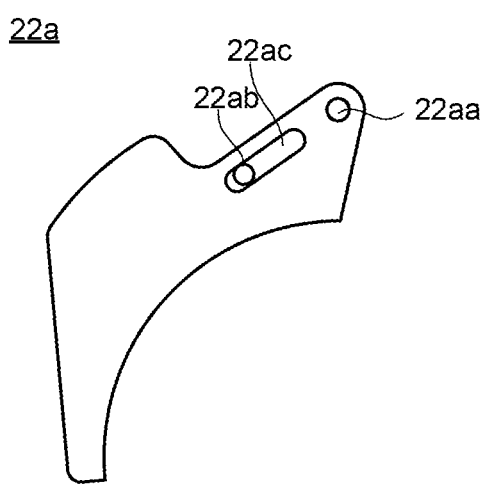
Figure 5:
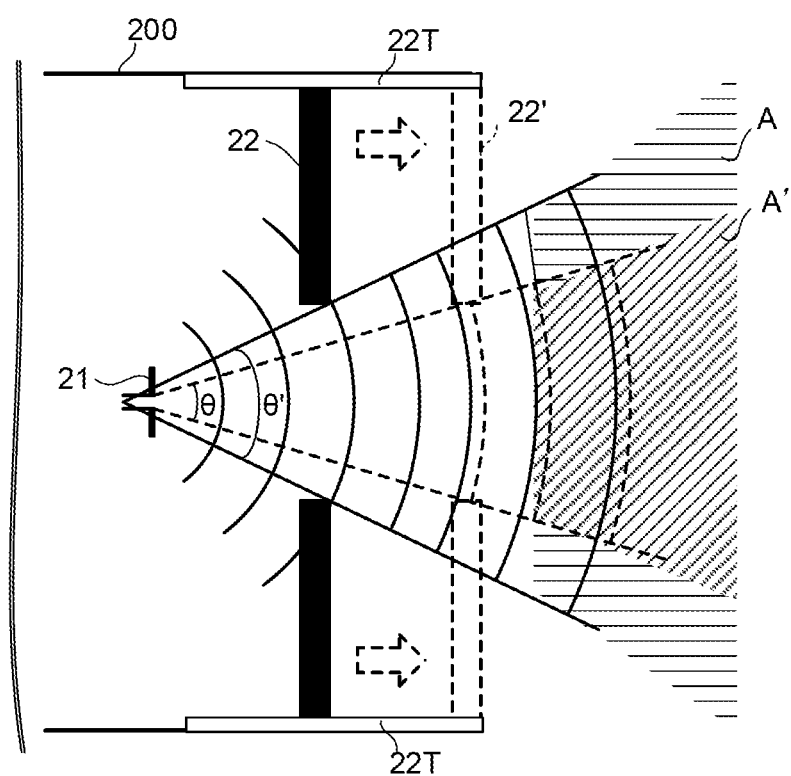
FIG. 5 is a diagram illustrating an example structure of the diaphragm section of the tag reader according to the first embodiment.

FIG. 3 to FIG. 5 are diagrams illustrating an example structure of diaphragm section 22 of tag reader 2 according to this embodiment.

In FIG. 3, the position at which diaphragm section 22 is disposed in casing 200 of tag reader 2 is illustrated. Diaphragm section 22 is disposed at the position of opening section 200a of casing 200 to restrict the angle of radiation at which antenna section 21 housed in casing 200 radiates the electromagnetic wave outside casing 200. Diaphragm section 22 functions as a window configured to make the opening diameter variable in opening section 200a.

FIG. 4A and FIG. 4B are views of diaphragm section 22 when viewed from the front side (which corresponds to the opening section 200a side of casing 200) and respectively correspond to a state where the opening diameter (AT in the figure) of opening section 200a is made larger and a state where the opening diameter (AT in the figure) of opening section 200a is made smaller. FIG. 4C illustrates only one blade-like member 22a of diaphragm section 22.

Diaphragm section 22 is formed of, for example, a combination of a plurality of blade-like members (22a to 22f in FIG. 4A) formed of an electromagnetic-wave absorption material. Such blade-like members formed of an electromagnetic-wave absorption material has a thickness that is within a range of 0.2 mm to 10.0 mm for absorbing an electromagnetic wave having a frequency of 1 GHz to 3 THz. This range is preferable because a mechanism for restricting the electromagnetic wave can be included without an increase in the size of the casing of the reader. To increase electromagnetic-wave absorptiveness, the blade-like members may have an uneven structure measured in millimeters on the surface thereof. As the electromagnetic-wave absorption material, a publicly known material can be used, and examples thereof include a hard magnetic material having a coercive force of 500 Oe or more. Examples of the hard magnetic material include $\gamma\text{-}Fe_2O_3$, $Fe_3O_4$, $CrO_2$, Fe, Co, Ni, Fe—Co, Co—Ni, Fe—Ni, Co-adhered $\gamma\text{-}Fe_2O_3$, and Co-adhered $Fe_3O_4$, and a mixture of one type or two or more types thereof is used. These materials are selected as appropriate in accordance with the frequency of the electromagnetic wave issued from tag reader 2.

Blade-like members 22a to 22f each have a pivot (22aa in FIG. 4C) for fixing and a pin groove (22ac in FIG. 4C) along which a pin (22ab in FIG. 4C) moves to allow the blade-like member to move accordingly. In diaphragm section 22, the pivot (22aa in FIG. 4C) of each of blade-like members 22a to 22f is fixed to opening section 200a of casing 200 of tag reader 2. When the pin (22ab in FIG. 4C) moves, the opening diameter AT is adjusted.

FIG. 5 is an enlarged view of diaphragm section 22 when viewed from a cross section of casing 200. Diaphragm section 22 according to this embodiment further includes moving mechanism 22T for making the distance to antenna section 21 variable. Moving mechanism 22T is, for example, a rack-and-pinion gear and moves the position of blade-like members 22a to 22f forward or backward relative to the position of antenna section 21 to make the angle of radiation of the electromagnetic wave adjustable.

FIG. 5 illustrates a state where the position of blade-like members 22a to 22f is moved forward (dotted line 22') to adjust angle of radiation θ of the electromagnetic wave to a narrower angle (dotted line θ'), thereby adjusting check range A to a narrower range (dotted line A').

That is, in this embodiment, the angle of radiation of the electromagnetic wave is adjusted by a combination of an adjustment of the aperture diameter of diaphragm section 22 and an adjustment of the distance between antenna section 21 and diaphragm section 22. The adjustment of the distance may be made by moving one of or both antenna section 21 and diaphragm section 22.

The range of the angle of radiation of the electromagnetic wave when viewed from antenna section 21 is, for example, from 1° to 45° and is more preferably from 5° to 30°. With this range, when an item is checked, tag reader 2 can easily face tag 1, and tag 1 can be easily checked.

Diaphragm section 22 according to this embodiment includes an actuator (not illustrated) that controls blade-like members 22a to 22f described above and an actuator (not illustrated) that controls moving mechanism 22T. The angle of radiation of the electromagnetic wave is adjusted by control section 20 (check range control section 20d) driving these actuators.

Operations of Tag Reader

Figure 6:
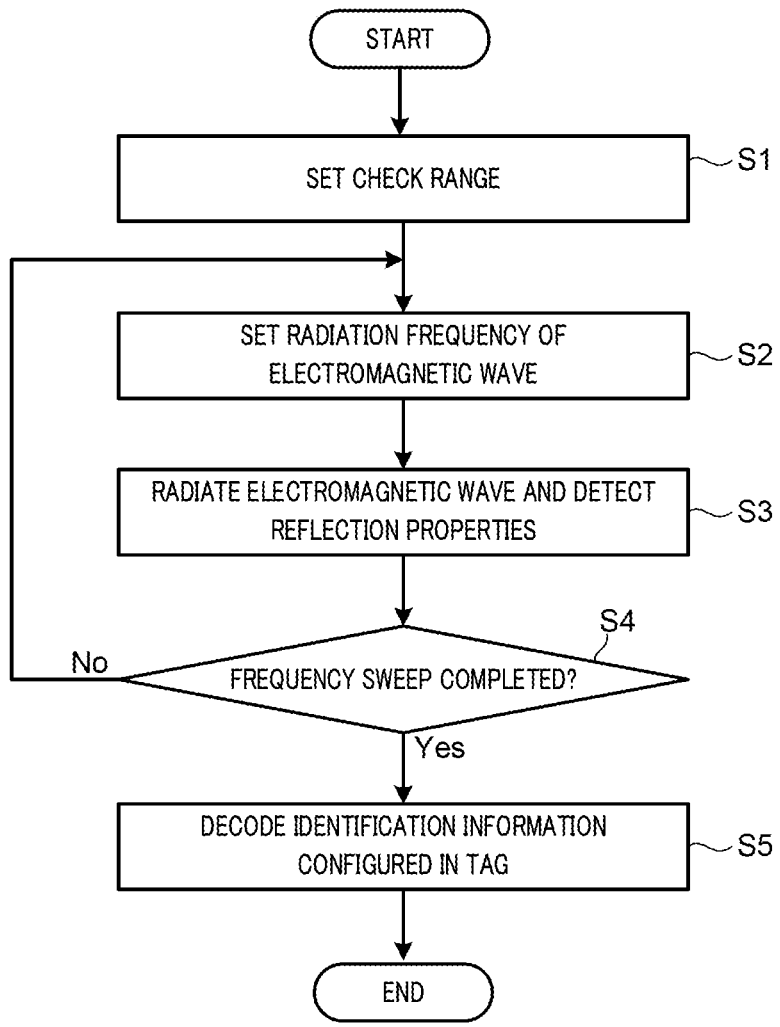
FIG. 6 is a flowchart illustrating example operations of the tag reader according to the first embodiment.

FIG. 6 is a flowchart illustrating example operations of tag reader 2 according to this embodiment. The flowchart in FIG. 6 illustrates a process that is performed by control section 20 in accordance with, for example, operations of operation input section 24 of tag reader 2.

In step S1, control section 20 (check range control section 20d) first controls power to be supplied to antenna section 21 from driving section 20a (the output of an electromagnetic wave to be radiated) and the degree of aperture of diaphragm section 22 so that the check range matches the check target range set by, for example, an operator.

In step S1, control section 20 (check range control section 20d) may search for the position of tag 1 and, for example, adjust the check range by calibration on the basis of the position of tag 1.

In step S2, control section 20 (driving section 20a) sets the radiation frequency of the electromagnetic wave to be radiated from antenna section 21.

In step S2, at the start of a check operation, control section 20 (driving section 20a) sets, for example, the lowest frequency in a predetermined frequency band that is to be frequency-swept. During the check operation, control section 20 (driving section 20a) gradually increases the frequency (for example, in increments of 1 MHz) to perform a frequency sweep.

In step S3, control section 20 (driving section 20a) causes antenna section 21 to radiate the electromagnetic wave at the frequency set in step S2 to emit the electromagnetic wave to tag 1. At this time, control section 20 (resonance frequency detecting section 20b) receives a reflected wave from tag 1 to antenna section 21 by, for example, switching a switch (not illustrated) of antenna section 21 and detects the reflection properties (for example, S parameters) of the reflected wave from tag 1.

In step S3, in a case where control section 20 (resonance frequency detecting section 20b) determines that resonance occurs in tag 1, control section 20 (resonance frequency detecting section 20b) stores the frequency in the RAM (not illustrated) as a resonance frequency of tag 1.

In step S4, control section 20 (driving section 20a) determines whether the frequency sweep of the predetermined frequency band set in advance is completed. In a case where control section 20 (driving section 20a) determines that the frequency sweep of the predetermined frequency band is not completed (No in step S4), the flow returns to step S2, and control section 20 (driving section 20a) resets the frequency and repeatedly performs the above-described process.

In a case where control section 20 (driving section 20a) determines in step S4 that the frequency sweep of the predetermined frequency band set in advance is completed (Yes in step S4), control section 20 (driving section 20a) stops radiating the electromagnetic wave. Control section 20 (identification information reading section 20c) identifies the identification information of tag 1 on the basis of the detected resonance frequencies of tag 1. This identification process by control section 20 (identification information reading section 20c) is performed in accordance with, for example, a predetermined decoding rule.

Accordingly, tag reader 2 checks the identification information of tag 1.

Effects

As described above, in RFID system U according to this embodiment, tag 1 has the resonance structures (for example, microstrip antennas 1a and microstrip antennas 1b) so as to resonate in the EHF band or gigahertz band, and tag reader 2 detects the plurality of resonance frequencies of tag 1 by sweep radiation in the EHF band or gigahertz band. Accordingly, highly accurate check by tag reader 2 can be implemented, and the information density in tag 1 can be increased.

Further, tag reader 2 according to this embodiment includes diaphragm section 22 for appropriately adjusting the check range and control section 20 (check range control section 20d) that controls diaphragm section 22. Accordingly, highly accurate check can be implemented.

Second Embodiment

Figure 7:
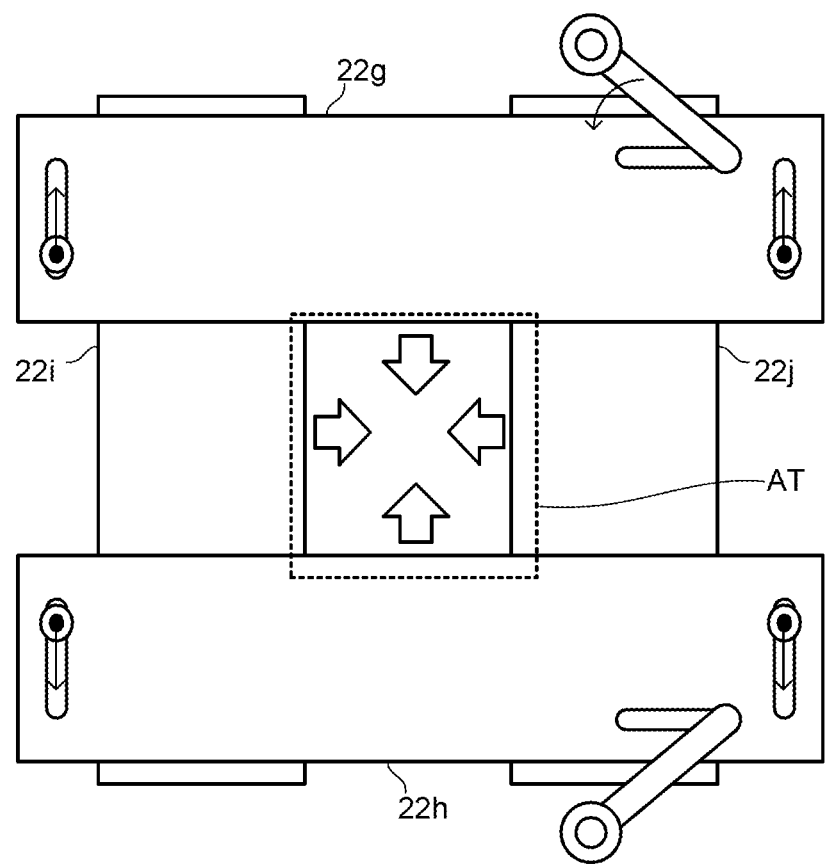
FIG. 7 is a diagram illustrating a configuration of the tag reader according to a second embodiment.

FIG. 7 is a diagram illustrating a configuration of tag reader 2 according to a second embodiment. FIG. 7 is similar to FIGS. 4A and 4B and is a view of diaphragm section 22 when viewed from the front side.

Tag reader 2 according to this embodiment is different from that in the first embodiment in terms of the configuration of diaphragm section 22. For the configuration common to the first embodiment, a description thereof is omitted (the same applies to the other embodiments described below).

Diaphragm section 22 according to this embodiment includes a pair of door members 22g and 22h that make the opening width variable in the vertical direction and a pair of door members 22i and 22j that make the opening width variable in the horizontal direction. With door members 22g, 22h, 22i, and 22j, the opening diameter (AT in the figure) of opening section 200a is adjusted in an independent manner.

Door members 22g and 22h that make the opening width variable in the vertical direction are each fixed to opening section 200a at appropriate positions with pins or the like via two grooves that are horizontal relative to the opening direction, and are movable while the moving direction is restricted to the vertical direction. The opening width is adjusted by arms that work in coordination with door members 22g and 22h.

Door members 22i and 22j that make the opening width variable in the horizontal direction are each fixed to opening section 200a at appropriate positions with pins or the like via two grooves that are vertical relative to the opening direction, and are movable while the moving direction is restricted to the horizontal direction. The opening width is adjusted by arms that work in coordination with door members 22i and 22j.

Door members 22g, 22h, 22i, and 22j are formed of, for example, an electromagnetic-wave absorption material similarly to the blade-like members (22a to 22f in FIGS. 4A and 4B) according to the first embodiment.

Diaphragm section 22 according to this embodiment includes an actuator driving the pair of door members 22g and 22h that make the opening width variable in the vertical direction and an actuator driving the pair of door members 22i and 22j that make the opening width variable in the horizontal direction. These actuators are controlled by control section 20 (check range control section 20d) independent of each other.

As described above, with tag reader 2 according to this embodiment, the check range can be controlled more flexibly.

Third Embodiment

Figure 8:
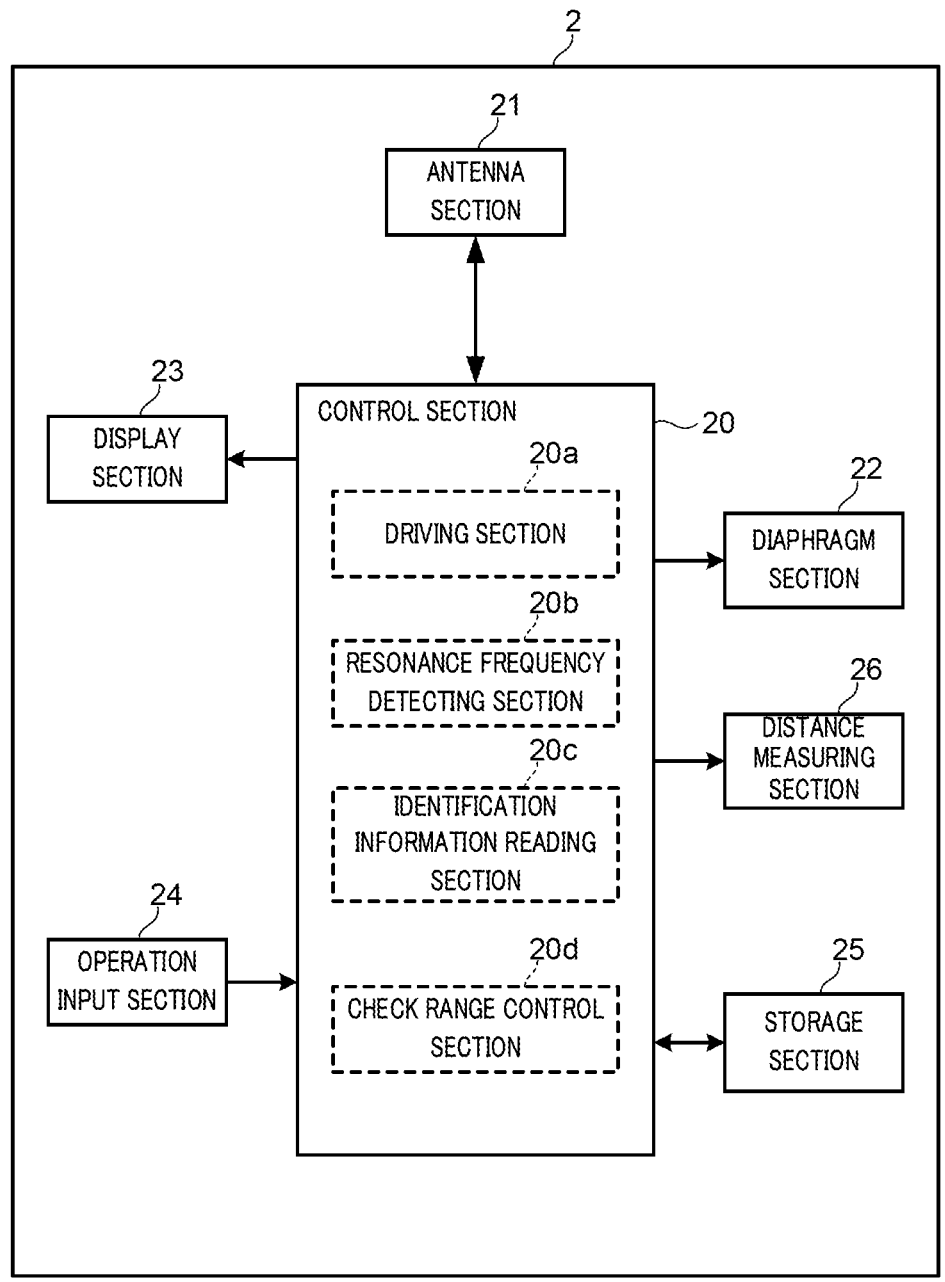
FIG. 8 is a diagram illustrating a configuration of the tag reader according to a third embodiment.

FIG. 8 is a diagram illustrating a configuration of tag reader 2 according to a third embodiment.

Tag reader 2 according to this embodiment includes distance measuring section 26, which is the difference from the first embodiment. Distance measuring section 26 measures the distance between antenna section 21 and tag 1 or the distance between antenna section 1 and an item to which tag 1 is attached. Distance measuring section 26 may measure the distance by using any method and includes, for example, a laser rangefinder.

The operations of distance measuring section 26 are controlled by, for example, a control signal from control section 20 (check range control section 20d). Distance measuring section 26 outputs the measured distance between antenna section 21 and tag 1 to control section 20 (check range control section 20d) to set the measured value for the check target range of check range control section 20d. In accordance with the set check target range, check range control section 20d sets the angle of radiation of the electromagnetic wave from antenna section 21 (for diaphragm section 22) and sets the output of the electromagnetic wave from antenna section 21 (for driving section 20a).

As described above, in tag reader 2 according to this embodiment, the distance to tag 1 is measured so that the check target range can be appropriately set.

Fourth Embodiment

Figure 9:
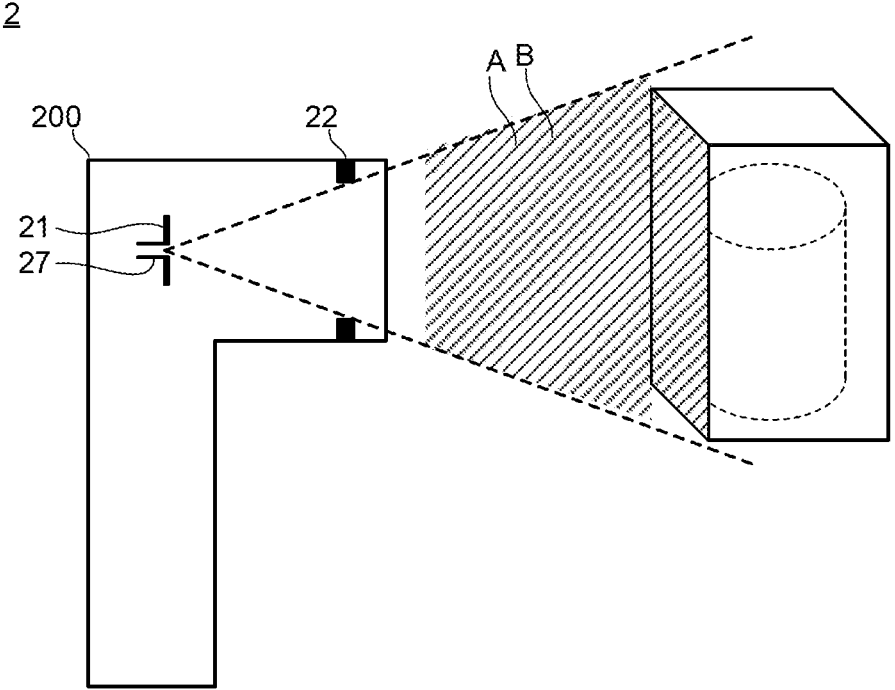
FIG. 9 is a diagram illustrating a configuration of the tag reader according to a fourth embodiment.

FIG. 9 is a diagram illustrating a configuration of tag reader 2 according to a fourth embodiment.

Tag reader 2 according to this embodiment includes visualizing section 27 for visualizing the region to which the electromagnetic wave is emitted, which is the difference from the first embodiment. Visualizing section 27 is disposed close to antenna section 21 and outputs visible light to a region (B in the figure) corresponding to the region (check range A) to which the electromagnetic wave is emitted. Visualizing section 27 increases the luminance to visualize the magnitude of the output of the electromagnetic wave.

As described above, tag reader 2 according to this embodiment can allow the operator to recognize the position to which the electromagnetic wave is emitted while the operator is performing a check operation using tag reader 2.

Fifth Embodiment

Figure 10:
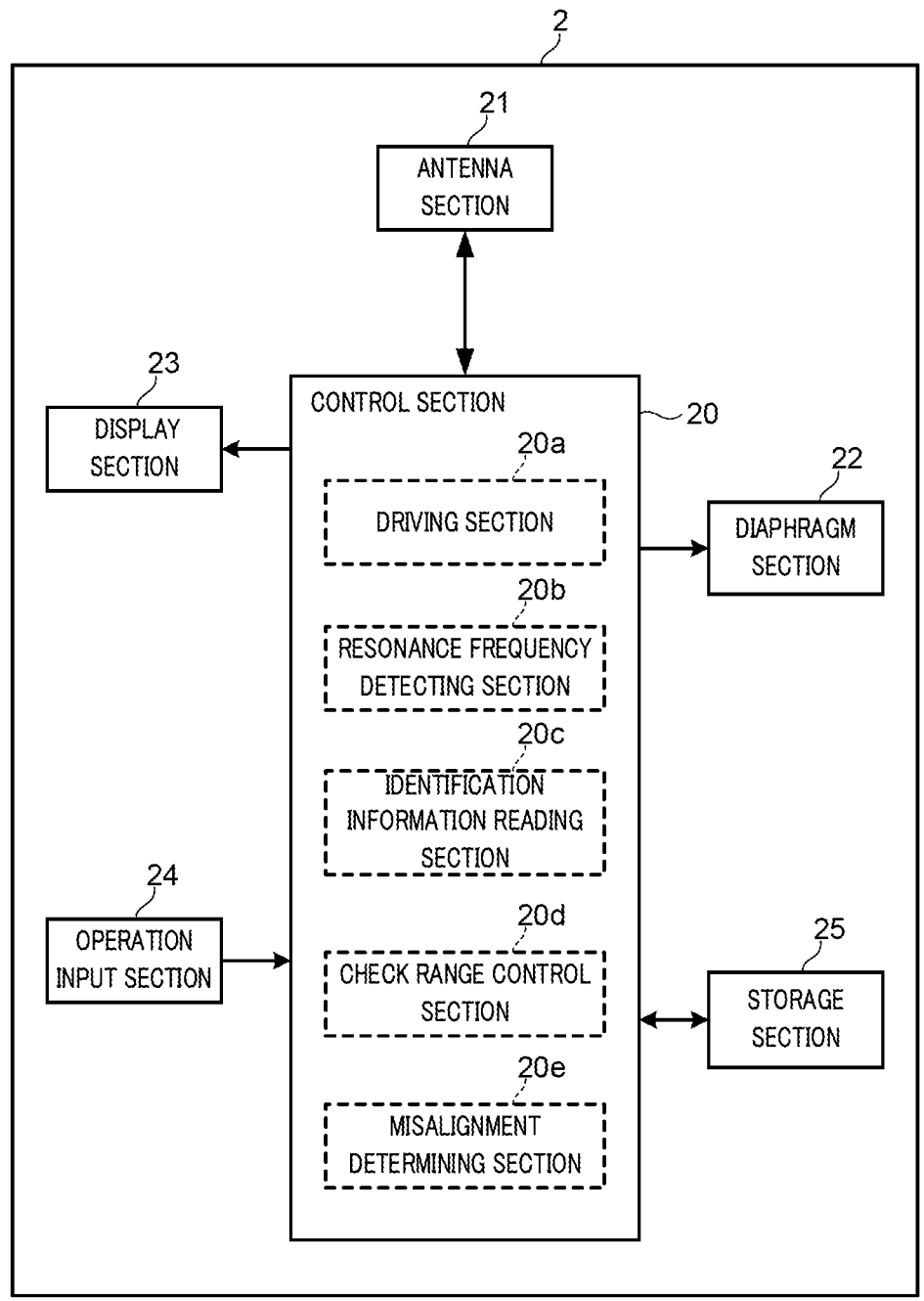
FIG. 10 is a diagram illustrating a configuration of the tag reader according to a fifth embodiment.

FIG. 10 is a diagram illustrating a configuration of tag reader 2 according to a fifth embodiment.

Tag reader 2 according to this embodiment includes misalignment determining section 20e that determines misalignment relative to tag 1, which is the difference from the first embodiment.

Tag 1 according to this embodiment is configured to have, for example, a predetermined reference resonance frequency (which is referred to as "first reference resonance frequency") different from the resonance frequencies for configuring the identification information. In other words, when the common reference resonance frequency is provided in tags 1, an index to be used when tag reader 2 performs calibration or an index to be used when the operator of tag reader 2 recognizes the position of tag 1 is set.

Misalignment determining section 20e determines misalignment of the electromagnetic wave relative to tag 1 in terms of the angle of emission on the basis of, for example, a reflected wave (for example, the reflection intensity) from tag 1 at the reference resonance frequency and reports the misalignment to the operator of tag reader 2.

More preferably, tag 1 is configured to have two different types of reference resonance frequencies (which are referred to as "second reference resonance frequency" and "third reference resonance frequency"). For example, one of these two types of reference resonance frequencies is selected from among frequencies higher than the resonance frequencies for configuring the identification information and the other is selected from among frequencies lower than the resonance frequencies for configuring the identification information. Accordingly, a frequency shift that occurs in a case where the surface of tag 1 is oriented such that the surface does not face tag reader 2 and the electromagnetic wave is emitted in a diagonal direction is corrected.

Figure 11A:
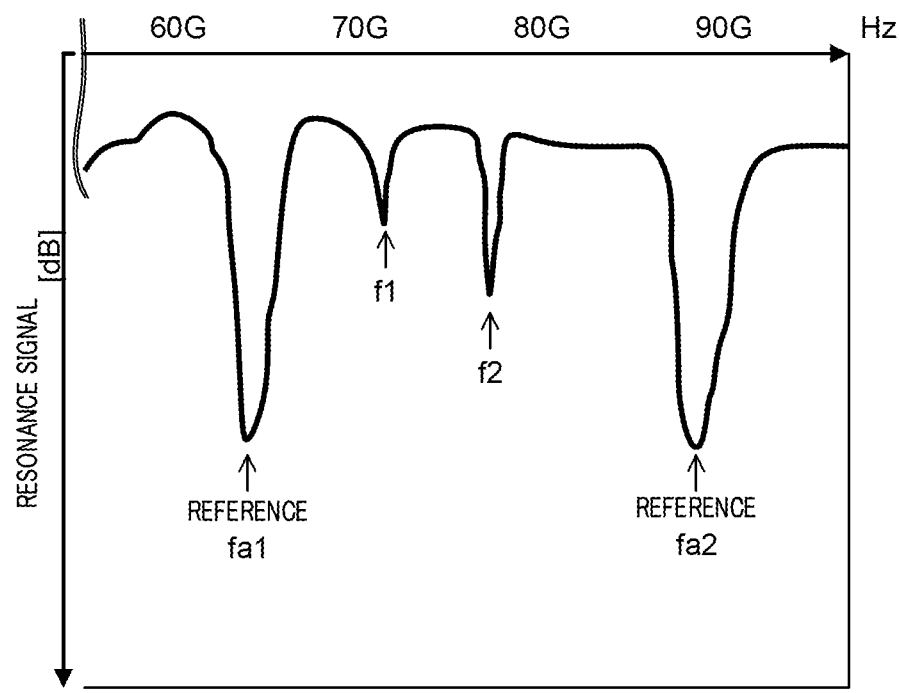
FIGS. 11A and 11B are graphs for describing a frequency shift that occurs in a case where an electromagnetic wave is emitted in a diagonal direction.
Figure 11B:
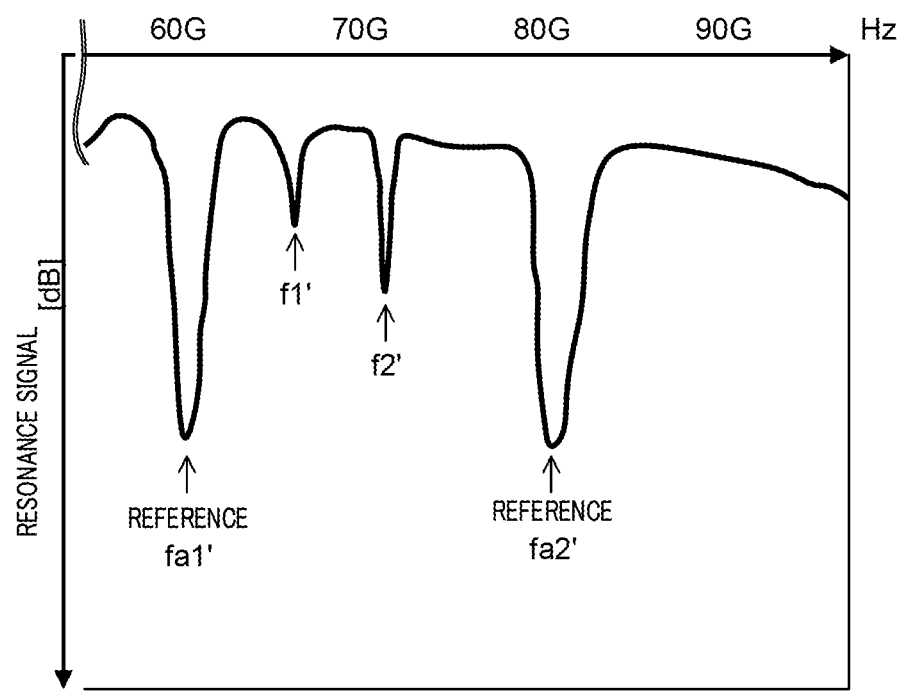

FIGS. 11A and 11B are graphs for describing a frequency shift that occurs in a case where the electromagnetic wave is emitted in a diagonal direction. FIG. 11A illustrates resonance frequencies detected in a state where no frequency shift occurs, and FIG. 11B illustrates resonance frequencies detected in a state where a frequency shift occurs.

In FIG. 11A, f1 and f2 represent resonance frequencies for configuring the identification information of tag 1, and fa1 and fa2 respectively represent the second reference resonance frequency and the third reference resonance frequency of tag 1. Similarly, in FIG. 11B, f1' and f2' represent resonance frequencies for configuring the identification information of tag 1, and fa1' and fa2' respectively represent the second reference resonance frequency and the third reference resonance frequency of tag 1.

As illustrated in FIG. 11B, in the case where the electromagnetic wave is emitted in a diagonal direction, frequencies f1', f2', fa1', and fa2' for which resonance is detected are shifted, in a compressed manner as a whole, to lower frequencies than frequencies f1, f2, fa1, and fa2 detected in a normal state.

In such a form, misalignment determining section 20e corrects frequencies at which the plurality of resonance frequencies for coding are detected respectively on the basis of, for example, the shift in second reference resonance frequency fa1' detected by resonance frequency detecting section 20b from second reference resonance frequency fa1 set in advance and the shift in third reference resonance frequency fa2' detected by resonance frequency detecting section 20b from third reference resonance frequency fa2 set in advance.

Misalignment determining section 20e corrects the resonance frequencies for coding on the basis of, for example, the relative position of resonance frequency f1' for coding detected by resonance frequency detecting section 20b relative to the shifted reference resonance frequency fa1' and the relative position of resonance frequency f2' for coding detected by resonance frequency detecting section 20b relative to the shifted reference resonance frequency fa2'. Accordingly, tag reader 2 can identify the correct identification information.

As described above, tag reader 2 according to this embodiment can check the identification information with a higher accuracy.

Other Embodiments

The present invention is not limited to the above-described embodiments, and various modifications can be made.

For example, tag 1 may include a plurality of regions each having a plurality of resonance frequencies. Accordingly, the amount of information and the capacity can be further increased with this number of regions (positions). In this case, a synthetic aperture radar technique (see, for example, PTL 1) may be applied to tag reader 2 for identifying a received electromagnetic wave for each region. Alternatively, a phased-array antenna technique may be applied.

Tag reader 2 may include a vibration correction mechanism for receiving a reflected wave with high accuracy.

Tag reader 2 may employ a configuration in which diaphragm section 22 is configured to be manually operated instead of the above-described configuration in which diaphragm section 22 is configured to be controlled by control section 20.

In the above-described embodiments, various examples of tag reader 2 are illustrated. The forms illustrated in the embodiments may be combined as appropriate, as a matter of course.

Specific examples of the present invention have been described in detail; however, the specific examples are only examples and are not intended to limit the claims Techniques described in the claims include various modifications and changes made to the specific examples illustrated above.

The disclosure of Japanese Patent Application No. 2017-190567, filed on Sep. 29, 2017, including the specification, drawings, and abstract, is incorporated herein by reference in its entirety.

INDUSTRIAL APPLICABILITY

With the tag reader according to the present disclosure, it is possible to increase the information density of chipless RFID tags and to increase check accuracy when identification information is read from the chipless RFID tags.

REFERENCE SIGNS LIST

U RFID system
1 Chipless RFID tag
2 Tag reader
20 Control section
21 Antenna section
22 Diaphragm section
23 Display section
24 Operation input section
25 Storage section
26 Distance measuring section
27 Visualizing section
200 Casing
200a Opening section

The invention claimed is:

1. A tag reader applicable to a chipless RFID tag having a plurality of resonance frequencies associated with identification information, the tag reader comprising:
   an antenna that is provided in a casing;
   a diaphragm;
   a hardware processor configured to:
   radiate the electromagnetic wave through an opening formed on the casing in such a manner as to cause a radiation frequency to sweep in a predetermined EHF band or gigahertz band,
   detect the plurality of resonance frequencies of the chipless RFID tag on the basis of a reflection property of a reflected wave from the chipless RFID tag resulting from the radiated electromagnetic wave, and
   restrict, by the diaphragm, the angle of radiation at which the antenna radiates the electromagnetic wave through the opening on the basis of the reflection property of the reflected wave from the chipless RFID tag resulting from the radiated electromagnetic wave.

2. The tag reader according to claim 1, wherein
   the diaphragm is a window formed of an electromagnetic-wave absorption material and configured to make an opening diameter of the opening variable.

3. The tag reader according to claim 2, wherein
   the diaphragm is configured to make the opening diameter of the opening variable in a horizontal direction and in a vertical direction in an independent manner.

4. The tag reader according to claim 1, wherein
   the diaphragm is configured to make a distance to the antenna variable.

5. The tag reader according to claim 1, wherein
   the hardware processor is further configured to control the diaphragm on the basis of a set check target range.

6. The tag reader according to claim 5, wherein the hardware processor is configured to control an output of the electromagnetic wave to be radiated from the antenna on the basis of the set check target range.

7. The tag reader according to claim 5, further comprising a distance measuring apparatus that measures a distance between the antenna and the chipless RFID tag or a distance between the antenna and an item to which the chipless RFID tag is attached, wherein
the hardware processor is configured to set the check target range on the basis of a result of measurement by the distance measuring apparatus.

8. The tag reader according to claim 1, further comprising a visualizing apparatus that visualizes a region to which the electromagnetic wave is emitted.

9. The tag reader according to claim 8, wherein
the visualizing apparatus outputs visible light so as to correspond to the region to which the electromagnetic wave is emitted.

10. The tag reader according to claim 1, wherein
the chipless RFID tag has a first reference resonance frequency, and
the hardware processor is further configured to determine misalignment of emission relative to the chipless RFID tag on the basis of the reflection property of the reflected wave from the chipless RFID tag at the first reference resonance frequency.

11. The tag reader according to claim 10, wherein
the chipless RFID tag has a second reference resonance frequency and a third reference resonance frequency, and
the hardware processor is configured to correct frequencies at which the plurality of resonance frequencies are detected respectively on the basis of frequencies at which the second reference resonance frequency and the third reference resonance frequency are detected respectively.

12. An RFID system comprising the tag reader according to claim 1.

13. A method for reading identification information of a chipless RFID tag having a plurality of resonance frequencies associated with the identification information, the method comprising:
    radiating an electromagnetic wave through an opening formed on the casing in such a manner as to cause a radiation frequency to sweep in a predetermined EHF band or gigahertz band;
    detecting the plurality of resonance frequencies of the chipless RFID tag on the basis of a reflection property of a reflected wave from the chipless RFID tag resulting from the radiated electromagnetic wave;
    restricting, by a diaphragm, an angle of radiation at which the antenna radiates the electromagnetic wave through the opening on the basis of the reflection property of the reflected wave from the chipless RFID tag resulting from the radiated electromagnetic wave.

14. The method for reading identification information according to claim 13, wherein
    at least one of an angle of radiation and an output of the electromagnetic wave to be radiated is adjusted and radiated.

15. The method for reading identification information according to claim 14, wherein
    at least one of the angle of radiation and the output of the electromagnetic wave to be radiated is adjusted on the basis of a check target range that includes the chipless RFID tag.

* * * * *